(12) United States Patent
Satake

(10) Patent No.: US 10,479,143 B2
(45) Date of Patent: Nov. 19, 2019

(54) PNEUMATIC TIRE

(71) Applicant: Sumitomo Rubber Industries, Ltd., Kobe-shi, Hyogo (JP)

(72) Inventor: Madoka Satake, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 166 days.

(21) Appl. No.: 15/643,658

(22) Filed: Jul. 7, 2017

(65) Prior Publication Data

US 2018/0029424 A1 Feb. 1, 2018

(30) Foreign Application Priority Data

Jul. 28, 2016 (JP) ................. 2016-148352

(51) Int. Cl.
*B60C 13/02* (2006.01)
*B60C 11/01* (2006.01)

(52) U.S. Cl.
CPC ............. *B60C 13/02* (2013.01); *B60C 11/01* (2013.01)

(58) Field of Classification Search
CPC ......... B60C 11/00; B60C 11/03; B60C 11/01; B60C 13/02; B60C 13/002; B60C 2011/0381
USPC ...................................................... D12/605
See application file for complete search history.

(56) References Cited

U.S. PATENT DOCUMENTS

| 4,252,169 | A | * | 2/1981 | Watts | B60B 7/01 |
| | | | | | 152/154 |
| 5,769,977 | A | * | 6/1998 | Masaoka | B60C 11/0302 |
| | | | | | 152/209.23 |
| D504,388 | S | | 4/2005 | Umstot et al. | |
| D549,156 | S | * | 8/2007 | Umstot | D12/512 |
| 2010/0147426 | A1 | | 6/2010 | Janesh et al. | |
| 2012/0216930 | A1 | * | 8/2012 | Matsuda | B60C 11/11 |
| | | | | | 152/209.18 |

FOREIGN PATENT DOCUMENTS

JP 2012-6449 A 1/2012

OTHER PUBLICATIONS

Extended European Search Report, dated Nov. 27, 2017, for European Application No. 17177279.1.

* cited by examiner

*Primary Examiner* — Timothy Kennedy
*Assistant Examiner* — Farah Taufiq
(74) *Attorney, Agent, or Firm* — Birch, Stewart, Kolasch & Birch, LLP

(57) ABSTRACT

A pneumatic tire includes a tread portion, a pair of sidewall portions, bead portions formed radially inside the sidewall portions, shoulder blocks arranged in the tire circumferential direction with first pitches on at least one of end portions of the tread portion, side protectors protruding axially outwardly on at least one of the sidewall portions which is located on a side of the shoulder blocks, a recessed portion between a pair of side protectors adjacent in the tire circumferential direction. The side protectors are arranged in the tire circumferential direction with second pitches larger than the first pitches. Each side protector is provided with at least one first groove extending radially inwardly from a side of the tread portion and terminating within the side protector and at least one second groove extending radially outwardly from a side of the bead portion and terminating within the side protector.

20 Claims, 6 Drawing Sheets

PNEUMATIC TIRE

TECHNICAL FIELD

The present invention relates to a pneumatic tire provided with a side protector in a sidewall portion.

BACKGROUND ART

For example, Japanese Unexamined Patent Application Publication No. 2012-6449 (Patent Literature 1) has proposed a pneumatic tire provided in a sidewall portion with a side protector protruding outwardly in the tire axial direction. The side protector helps to prevent damage to the sidewall portion due to sharp stones or the like, for example.

In the side protector of Patent Literature 1, a recessed portion is provided. For example, when running on a muddy road covered with so deep mud that the tire is soaked up to a part of the sidewall portion, the recessed portion shears the mud, therefore, it is possible that traction is increased. However, the recessed portion of Patent Literature 1 tends to be clogged with the mud, and there is room for further improvement in mud performance.

SUMMARY OF THE INVENTION

The present invention was made in view of the above, and a primary object thereof is to provide a pneumatic tire capable of exerting excellent mud performance while improving durability of the sidewall portion by improving the side protector.

In one aspect of the present invention, a pneumatic tire comprises a tread portion, a pair of sidewall portions each extending inwardly in a tire radial direction from both end portions of the tread portion, a bead portion formed on an inside of each of the sidewall portions in the tire radial direction, a plurality of shoulder blocks arranged in the tire circumferential direction with first pitches on at least one of the end portions of the tread portion, a plurality of side protectors protruding outwardly in a tire axial direction on at least one of the sidewall portions which is located on a side of the shoulder blocks, a recessed portion between a pair of side protectors adjacent in the tire circumferential direction, the side protectors being arranged in the tire circumferential direction with second pitches larger than the first pitches, and each of the side protectors being provided with at least one first groove extending inwardly in the tire radial direction from a side of the tread portion and terminating within the side protector and at least one second groove extending outwardly in the tire radial direction from a side of the bead portion and terminating within the side protector.

In another aspect of the invention, it is preferred that the first groove and the second groove are each inclined to a same direction with respect to the tire radial direction.

In another aspect of the invention, it is preferred that a pair of the second grooves are provided on both sides in the tire circumferential direction of the at least one first groove.

In another aspect of the invention, it is preferred that an inner end of the at least one first groove in the tire radial direction is located inward of an outer end of the at least one second groove in the tire radial direction.

In another aspect of the invention, it is preferred that the recessed portion extends obliquely with respect to the tire radial direction so that adjacent side protectors overlap each other when viewed in the tire radial direction.

In another aspect of the invention, it is preferred that in a front view of the at least one of the sidewall portions, terminating end portions of the at least one first groove and the at least one second groove are rounded in an arc shape.

In another aspect of the invention, it is preferred that a width of the recessed portion gradually decreases inwardly in the tire radial direction.

In another aspect of the invention, it is preferred that the recessed portion is formed in a shape having at least one bent portion.

In another aspect of the invention, it is preferred that the second pitches are twice as large as the first pitches.

In another aspect of the invention, it is preferred that each of the side protectors are provided so as to extend over two adjacent shoulder blocks.

In another aspect of the invention, it is preferred that the shoulder blocks are divided by shoulder lateral grooves, and the recessed portion is provided at a position so as to connect with one of the shoulder lateral grooves.

DESCRIPTION OF THE PREFERRED EMBODIMENT

An embodiment of the present invention will now be described in conjunction with accompanying drawings.

Figure 1:
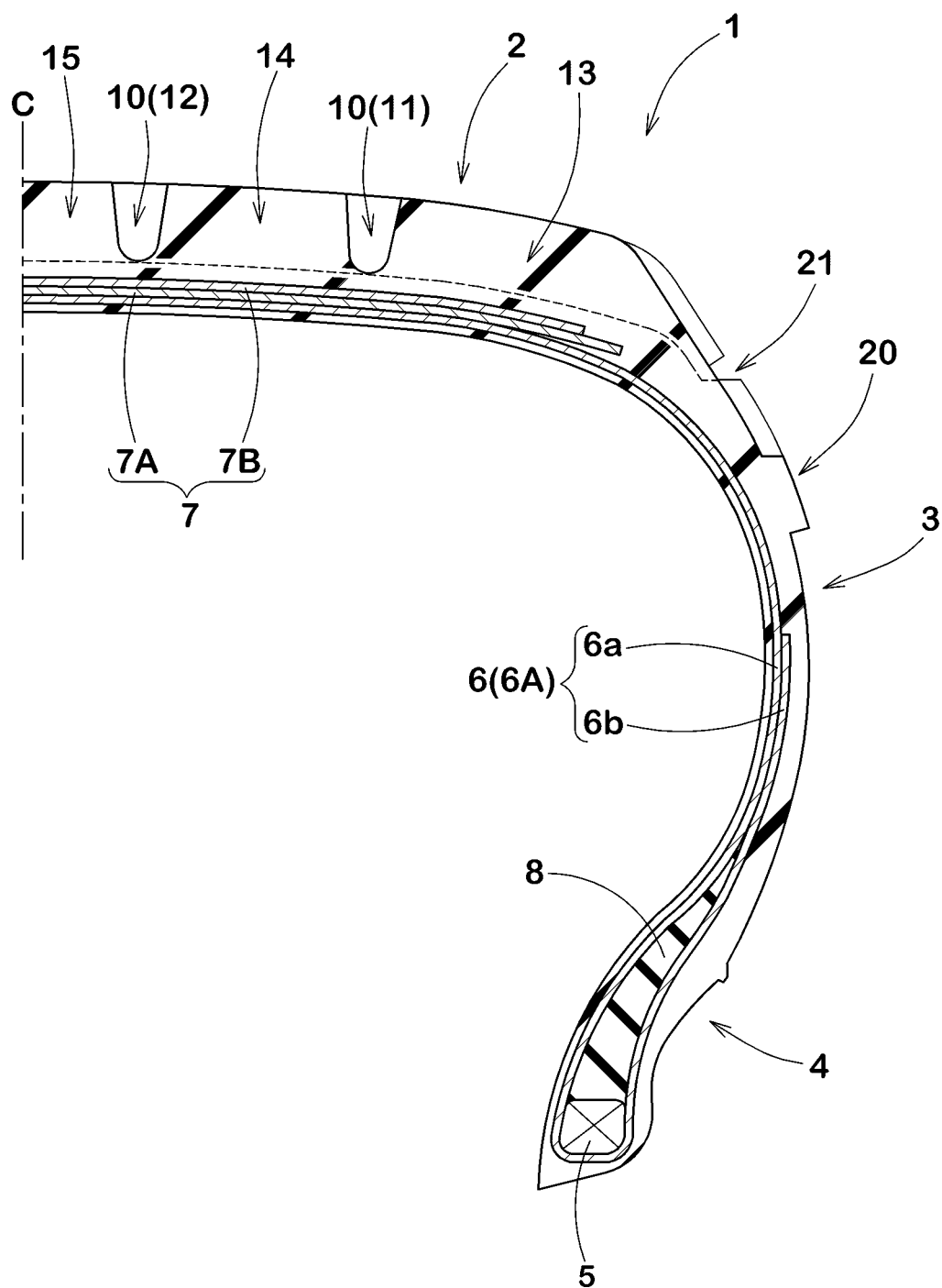
FIG. 1 is a transverse cross-sectional view of a pneumatic tire as an embodiment of the present invention.

FIG. 1 is a transverse cross-sectional view of a pneumatic tire (hereinafter may be simply referred to as "tire") 1 as an embodiment of the present invention. The tire 1 in this embodiment is suitably used, for example, for a 4WD-car such as an SUV that can travel not only on a paved road but also on a muddy road. However, the present invention is not limited to such an embodiment.

As shown in FIG. 1, the pneumatic tire 1 in this embodiment includes a tread portion 2, a pair of sidewall portions 3 each extending inwardly in the tire radial direction from both end portions of the tread portion 2, and bead portions 4 each formed inside in the tire radial direction of each of the sidewall portions 3.

For example, a carcass 6 and a belt layer 7 are provided inside the tire 1 in this embodiment.

For example, the carcass 6 extends from the tread portion 2 to bead cores 5 of the bead portions 4 through the sidewall portions 3. The carcass 6 is composed of, for example, at least one carcass ply 6A. The carcass ply 6A is composed of, for example, carcass cords arranged at an angle of 75 to 90 degrees with respect to the tire circumferential direction.

The carcass ply 6A includes, for example, a main body portion 6a and turned up portions 6b. The main body portion 6a extends between the bead cores 5 through the tread portion 2 and the sidewall portions 3, for example. Each of the turned up portions 6b is continuous with the main body portion 6a and turned up around one of the bead cores 5 adjacent to the respective turned up portion 6, for example.

A hard bead apex rubber 8 extending tapered from each of the bead cores 5 is disposed between the main body portion 6a and each of the turned up portions 6b, for example. Thereby, the bead portions 4 are reinforced.

The belt layer 7 is disposed, for example, inside the tread portion 2 and on the outside in the tire radial direction of the carcass 6. The belt layer 7 is composed of, for example, at least one belt ply (two belt plies 7A and 7B in this embodiment) in which belt cords made of steel are arranged obliquely. It is preferred that the belt cords are arranged so as to intersect with those in an adjacent belt ply, for example. The belt cords in this embodiment are arranged at an angle of 10 to 45 degrees with respect to the tire circumferential direction, for example.

The tread portion 2 is provided with at least one main groove 10 extending continuously in the tire circumferential direction, for example. The main groove 10 includes, for example, at least one shoulder main groove 11 disposed axially outermost and at least one crown main groove 12 disposed between the shoulder main groove 11 and the tire equator C.

The tread portion 2 is provided with at least one shoulder land region 13 located axially outside the shoulder main groove 11, at least one middle land region 14 located between the shoulder main groove 11 and the crown main groove 12, and at least one crown land region 15 located on the side of the tire equator C of the crown main groove 12.

Figure 2:
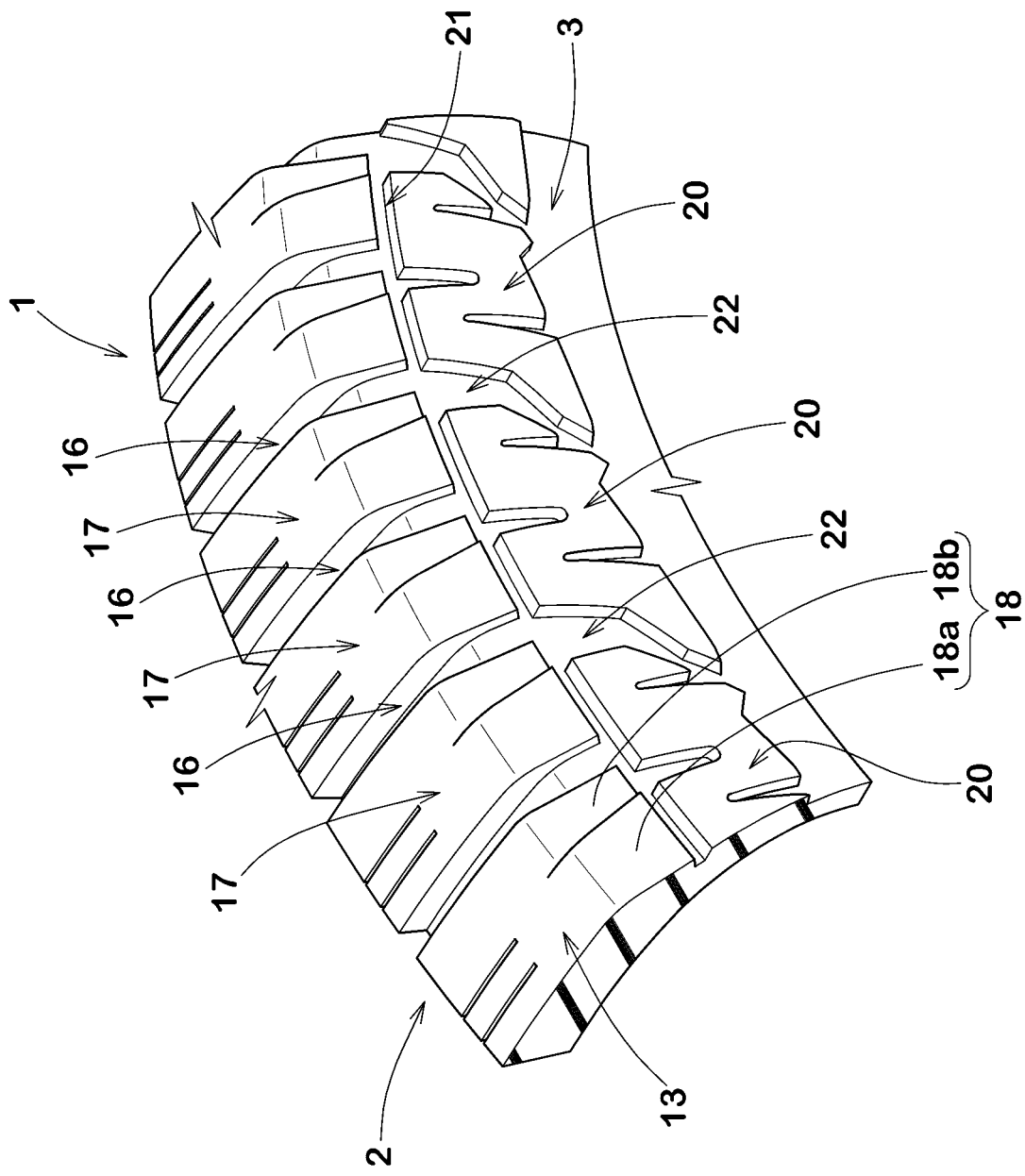
FIG. 2 is an enlarged perspective view of a shoulder land region and a sidewall portion of FIG. 1.

FIG. 2 illustrates an enlarged perspective view showing the shoulder land region 13 and one of the sidewall portions 3. As shown in FIG. 2, the shoulder land region 13 is provided with a plurality of shoulder blocks 17 divided by shoulder lateral grooves 16. The shoulder blocks 17 are arranged with first pitches in the tire circumferential direction. In other words, at least one of the end portions of the tread portion 2 is provided with a plurality of the shoulder blocks 17 arranged with the first pitches in the tire circumferential direction. As a preferred embodiment, the plurality of the shoulder blocks 17 are provided on both sides (not shown) of the tread portion 2 in this embodiment.

A side face 18 of at least one of, preferably each of the shoulder blocks 17 includes, for example, a first face 18a provided axially outermost and a second face 18b receding axially inwardly from the first face 18a. However, the shoulder blocks 17 are not limited to such a configuration.

A plurality of side protectors 20 protruding axially outwardly is provided in the one of the sidewall portions 3 which is located on a side of the shoulder blocks. The plurality of the side protectors 20 may be provided in the one of the sidewall portions 3 on the side of the shoulder blocks 17. The shoulder blocks 17 and the side protectors 20 in this embodiment are separated by a side narrow groove 21 extending in the tire circumferential direction between the shoulder blocks 17 and the side protectors 20. The side narrow groove 21 is connected with the shoulder lateral grooves 16, for example. Thereby, each of the shoulder blocks 17 is separated from its adjacent one in the tire circumferential direction by one of the shoulder lateral grooves 16 in a front view of the one of the sidewall portions 3 as well.

The sidewall portions 3 are further provided with recessed portions 22 each recessed between adjacent side protectors 20 in the tire circumferential direction. The recessed portions 22 are connected with the side narrow groove 21, for example.

The side protectors 20 can suppress the occurrence of cut damage due to collision of sharp stones or the like against the one of the sidewall portions 3, for example. Further, when traveling on a muddy road covered with so deep mud that the tire 1 is soaked up to a part of the sidewall portions 3, the recessed portions 22 shears the mud to generate large traction, thereby, it is possible that the mud performance is improved.

Figure 3:
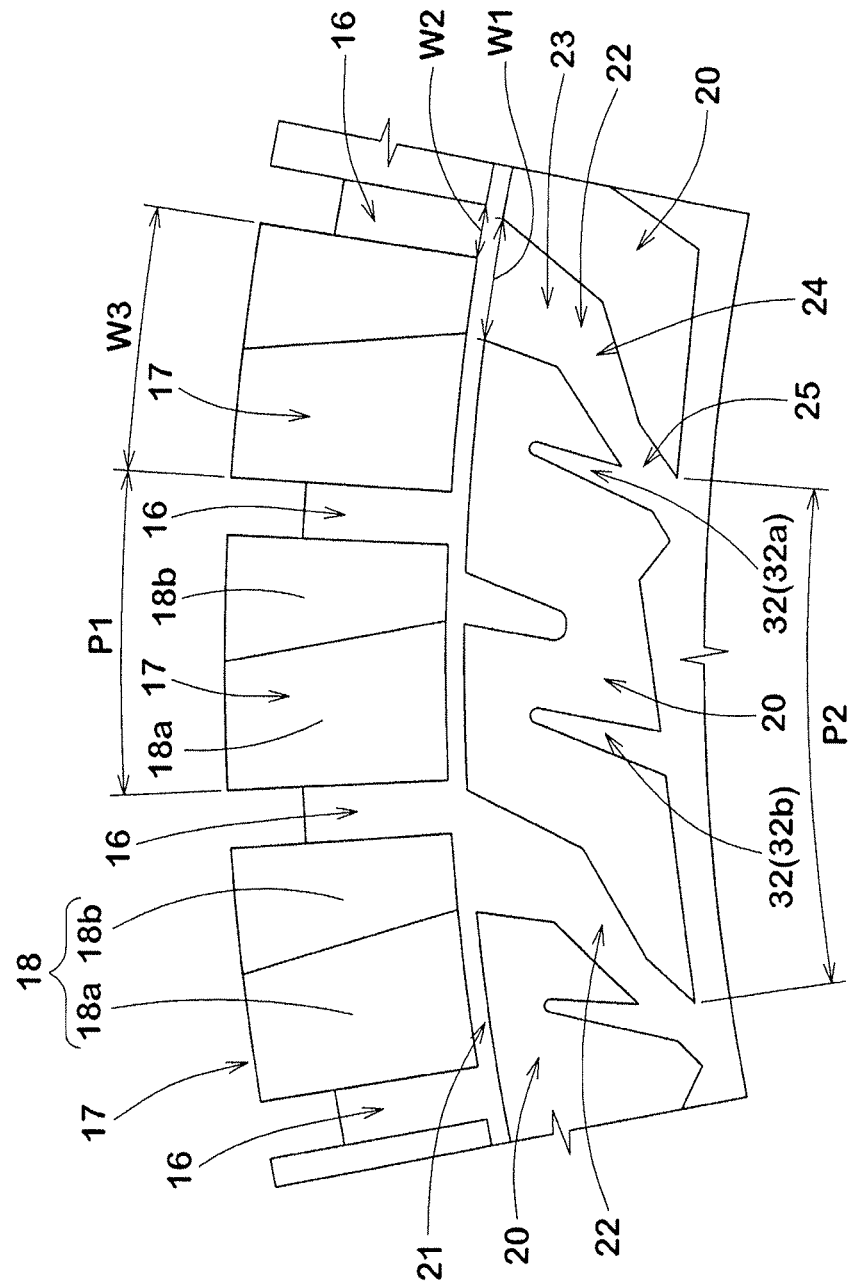
FIG. 3 is an enlarged front view of a side protector and a recessed portion of FIG. 2.

FIG. 3 illustrates an enlarged front view of the side protectors 20 and the recessed portions 22. As shown in FIG. 3, it is preferred that the recessed portions 22 are each provided at positions so as to connect with one of the shoulder lateral grooves 16 via the side narrow groove 21, for example. The recessed portions 22 configured as such are useful for discharging mud in the shoulder lateral grooves 16 to the outside of the tire during running on a muddy road.

It is preferred that the recessed portions 22 extend obliquely with respect to the tire radial direction, for example, in the front view of the one of the sidewall portions 3. Therefore, adjacent ones of the side protectors 20 overlap each other when viewed in the tire radial direction. Thereby, it is possible that rigidity distribution in the tire circumferential direction of the one of the sidewall portions 3 is smoothed, and consequently that durability of the one of the sidewall portions 3 is improved.

Figure 4:
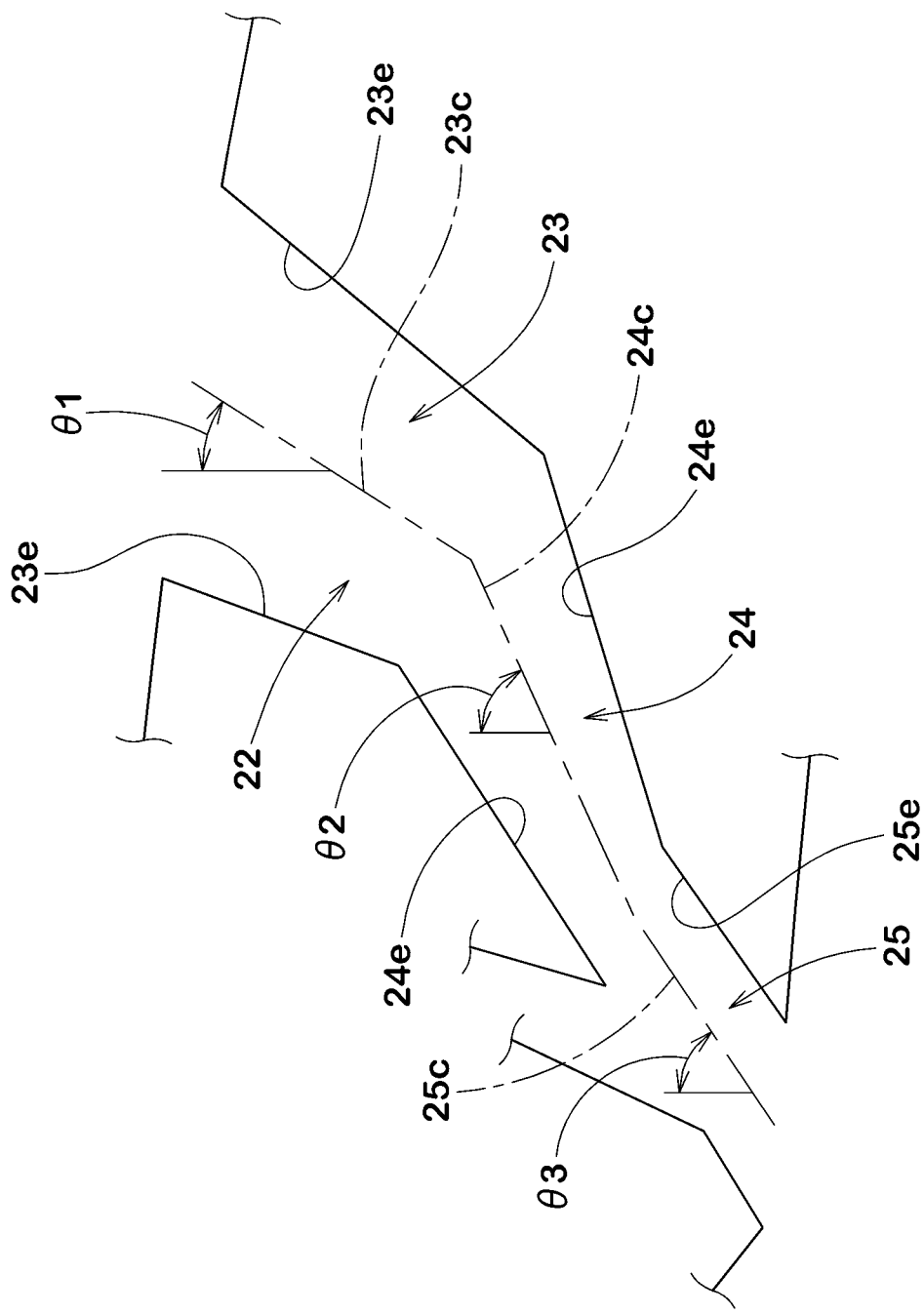
FIG. 4 is an enlarged front view showing an outline of the recessed portion of FIG. 3.

FIG. 4 illustrates an enlarged front view of outline of the recessed portions 22. As shown in FIG. 4, at least one of, preferably each of, the recessed portions 22 in this embodiment includes, for example, a first portion 23 provided radially outermost, a second portion 24 connected with the first portion 23 on the inside thereof in the tire radial direction, and a third portion 25 connected with the second portion 24 on the inside thereof in the tire radial direction.

The first portion 23 is configured so that a center line 23c thereof is inclined at an angle $\theta 1$ in a range of from 25 to 45 degrees with respect to the tire radial direction, for example. A pair of edges 23e of the first portion 23 extends straight, for example.

The second portion 24 has a pair of edges 24e extending straight in a bent manner with respect to the respective edges 23e of the first portion 23, for example. The second portion 24 is configured so that a center line 24c thereof is inclined at an angle $\theta 2$ in a range of from 50 to 70 degrees with respect to the tire radial direction, for example.

At least one of edges 25e of the third portion 25 is connected with the edges 24e of the second portion 24 in a bent manner. The at least one of the edges 25e is connected with the edges 24e at an angle smaller than the edges 24e of the second portion 24 with respect to the tire radial direction, for example. Thereby, the third portion 25 is configured so that a center line 25c thereof is inclined at an angle $\theta 3$ in a range of from 45 to 65 degrees with respect to the tire radial direction, for example.

It is preferred that each of the recessed portions 22 in this embodiment is bent at least at one part thereof by including the first portion 23, the second portion 24, and the third portion 25 described above. The recessed portions 22 configured as such can generate large reaction force when shearing mud.

It is preferred that the recessed portions 22 have widths gradually decreasing radially inwardly at least in the first portions 23 and the second portions 24, for example. The recessed portions 22 configured as such can compress mud while guiding the mud from a side of the shoulder lateral grooves toward the inside in the tire radial direction during running on a muddy road. The compressed mud produces large reaction force when sheared and consequently high traction can be obtained.

As shown in FIG. 3, it is preferred that opening widths W1 of the recessed portions 22 at the side narrow groove 21 are, for example, larger than opening widths W2 of the shoulder lateral grooves 16 at the side narrow groove 21. Specifically, it is preferred that the opening widths W1 of the recessed portions 22 are in a range of from 2.0 to 3.0 times the opening widths W2 of the shoulder lateral grooves 16. Further, it is preferred that the opening widths W1 of the recessed portions 22 are smaller than widths W3 of ground contacting surfaces of the shoulder blocks 17 in the tire circumferential direction. Thereby, the durability and the mud performance of the sidewall portions 3 are improved in a good balance.

The side protectors 20 are arranged in the tire circumferential direction with second pitches P2 larger than the first pitches P1. Thereby, a length of each of the side protectors 20 in the tire circumferential direction is sufficiently secured, and consequently it is possible that damage to the sidewall portions 3 is surely prevented.

The second pitches P2 are preferably not less than 1.5 times, more preferably not less than 1.8 times the first pitches P1, and preferably not greater than 2.5 times, more preferably not greater than 2.2 times the first pitches P1, for example. with the second pitches P2 configured as such, each of the side protectors 20 in this embodiment is provided so as to extend over two adjacent ones of the shoulder blocks 17. Thereby, the length of each of the side protectors 20 and the number of the recessed portions 22 per circumference of the tire are made appropriate, therefore, the durability and the mud performance of the sidewall portions 3 are improved in a good balance.

Figure 5:
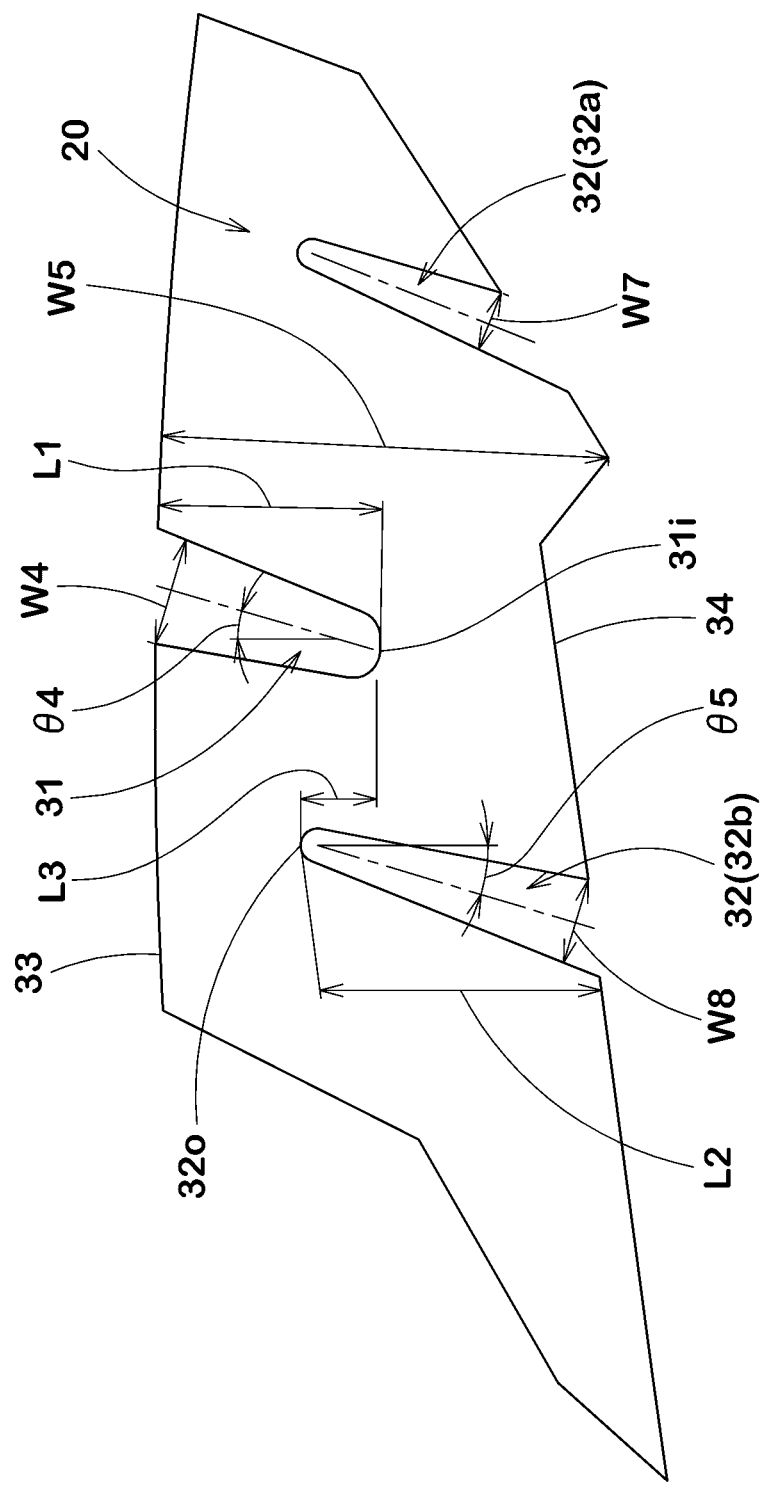
FIG. 5 is an enlarged front view of the side protector of FIG. 3.

FIG. 5 illustrates an enlarged front view of the side protectors 20. Each of the side protectors 20 is provided with at least one first groove 31 and at least one second groove 32 (two second grooves 32 in this embodiment). The first groove 31 extends radially inwardly from a side of the tread portion 2 and terminates within the side protector 20. The second groove 32 extends radially outwardly from a side of the bead portion 4 and terminates within the side protector 20.

The first grooves 31 and the second grooves 32 help to shear more mud on the muddy road and consequently the mud performance is further improved. Further, the side protectors 20 provided with the first grooves 31 and the second grooves 32 configured as such tend to deform so that widths of the first grooves 31 and widths of the second grooves 32 decrease at the time of stepping on a road surface and increase at the time of kicking out the road surface. Thereby, the mud in the first grooves 31 and the second grooves 32 and the recessed portions 22 is effectively discharged. Therefore, it is possible that the above effect is continuously obtained during running on the muddy road.

It is preferred that the first groove 31 and the second groove 32 are each inclined to the same direction with respect to the tire radial direction. The first groove 31 and the second groove 32 in this embodiment are each inclined to the same direction as the recessed portions 22 with respect to the tire radial direction. Such an arrangement of the first groove 31 and the second groove 32 makes the side protectors 20 deform easily, therefore, helps to further improve the above-mentioned effect.

It is preferred that an angle θ4 of the first groove 31 with respect to the tire radial direction is at least smaller than the angle θ2 (shown in FIG. 4) of the second portion 24 of the recessed portions 22. Furthermore, it is preferred that the angle θ4 of the first groove 31 is smaller than the angle θ1 (shown in FIG. 4) of the first portion 23 of the recessed portions 22. specifically, it is preferred that the angle θ4 of the first groove 31 is, for example, in a range of from 5 to 15 degrees.

As shown in FIG. 3, it is preferred that the first groove 31 is misaligned with the shoulder lateral grooves 16 in the tire circumferential direction and connected with the side narrow groove 21, for example. In other words, the first groove 31 is disposed, for example, inside the shoulder blocks 17 in the tire radial direction. Thereby, excessive deformation of the side protectors 20 can be suppressed, and the durability of the sidewall portions 3 can be increased. As a more preferable embodiment, the first groove 31 is disposed radially inside a region of the shoulder blocks 17 where the second face 18b is formed. Thereby, the first face 18a of the shoulder blocks 17 and an outer surface of the side protectors 20 are connected via the side narrow groove 21, therefore, it is possible that uneven wear of the first face 18a is suppressed.

As shown in FIG. 5, it is preferred that the first grooves 31 have widths gradually decreasing radially inwardly, for example. It is preferred that maximum widths W4 of the first grooves 31 are smaller than the opening widths W1 (shown in FIG. 3) of the recessed portions 22, for example. Specifically, it is preferred that the maximum widths W4 of the first grooves 31 are in a range of from 0.30 to 0.45 times the opening widths W1 of the recessed portions 22. The first grooves 31 configured as such can capture a lot of mud inside while suppressing an excessive decrease in rigidity of the side protectors 20. Note that, in this specification, the maximum widths of the first and the second grooves mean the maximum widths in a direction perpendicular to the center lines of the first and the second grooves.

From the same point of view, it is preferred that lengths L1 of the first grooves 31 in the tire radial direction are in a range of from 0.45 to 0.55 times maximum widths W5 of the side protectors 20 in the tire radial direction.

It is preferred that each of the side protectors 20 is provided with a pair of the second grooves 32 on both sides of the first groove 31 in the tire circumferential direction, for example. Thereby, it is possible that more mud is sheared, and consequently the mud performance is improved.

It is preferred, for example, one of the second grooves 32 in this embodiment (a second groove 32a in FIG. 5) disposed on one side (the right side in FIG. 5) of the first groove 31 is, for example, connected with the third portion 25 (shown in FIG. 3) of the recessed portions 22. Thereby, it is possible that the third portion 25 of the recessed portions 22 in conjunction with the second groove 32a shears a lot of mud.

In a case where the second groove 32a and the third portion 25 of the recessed portions 22 are connected with each other, it is possible that the rigidity of the side protectors 20 is decreased at an end portion in the tire circumferential direction. Therefore, the second groove 32a in this embodiment disposed on the one side is provided at a position farther away from the first groove than a second groove 32b disposed on the other side (the left side in FIG. 5) of the first groove 31. Thereby, damage to the side protectors 20 in the vicinity of the second groove 32a disposed on the one side is suppressed.

It is preferred that an angle θ5 of each of the second grooves 32 (the second grooves 32a and 32b) with respect to the tire radial direction is at least smaller than the angle θ2 of the second portions 24 of the recessed portions 22. Further, it is preferred that the angle θ5 of the second grooves 32 in this embodiment is smaller than the angle θ1 of the first portions 23 of the recessed portions 22. specifically, it is preferred that the angle θ5 of the second grooves 32 is in a range of from 10 to 20 degrees, for example.

It is preferred that the second grooves 32 have widths gradually decreasing radially outwardly, for example. The second grooves 32 configured as such can strongly compress and harden the mud captured inside, and moreover, it is possible that the mud is smoothly discharged when the side protectors 20 are deformed.

It is preferred that maximum widths W7 of the second grooves 32a on the one side and maximum widths W8 of the second grooves 32b on the other side are smaller than the maximum widths W4 of the first grooves 31, for example. As a more preferred embodiment, the maximum widths W8 of the second grooves 32b on the other side in this embodiment are larger than the maximum widths W7 of the second grooves 32a on the one side. Thereby, rigidity distribution of the side protectors 20 can be made uniform, and damage thereof can be suppressed.

It is preferred that a length L2 of each of the second grooves 32 in the tire radial direction is in a range of from 0.60 to 0.70 times the maximum width W5 of the side protectors 20 in the tire radial direction, for example. As a more preferred embodiment, it is preferred that an inner end 31i of each of the first groove 31 in the tire radial direction is positioned on the radially inside of an outer end 32o of each of the second groove 32 in the tire radial direction. Such arrangement of the first and the second grooves further helps to promote the deformation of the side protectors 20.

In order to improve the durability and the mud performance of the one of the sidewall portions 3 in a good balance, an overlap length L3 in the tire radial direction from the inner end 31i of the first groove 31 to the outer end 32o of the second groove 32 is, for example, preferably not less than 0.09 times, more preferably not less than 0.20 times the maximum widths W5 of the side protectors 20 in the tire radial direction, and preferably not greater than 0.43 times, more preferably not greater than 0.30 times the maximum widths W5 of the side protectors 20 in the tire radial direction.

It is preferred that terminating end portions of the first groove 31 and the second groove 32 are rounded in an arc shape in the front view of the one of the sidewall portions 3. It is preferred that radii of curvature of the terminating end portions are in a range of from 1.0 to 3.0 mm, for example. The radius of curvature of the terminating end portion of the first groove 31 in this embodiment is larger than the radii of curvature of the terminating end portions of the second grooves 32a and 32b. Further, the radius of curvature of the second groove 32b on the other side is larger than the radius of curvature of the second groove 32a on the one side. Thereby, damage such as cracking of the side protectors starting from the terminating end portion of each of the first and the second grooves is suppressed.

Each of the side protectors 20 includes, for example, a first edge 33 extending in the tire circumferential direction on the outside in the tire radial direction and a second edge 34 extending in the tire circumferential direction on the inside in the tire radial direction. The first edge 33 in this embodiment extends along the tire circumferential direction, and the second edge 34 in this embodiment recedes radially outwardly at a part between the second groove 32a on the one side and the second groove 32b on the other side. The second edge 34 configured as such helps to moderately deform each of the second grooves 32a and 32b during running on a muddy road.

While detailed description has been made of the pneumatic tire as an embodiment of the present invention, the present invention can be embodied in various forms without being limited to the illustrated embodiment.

Working Example (Example)

Tires of size 265/70R17 having a basic structure shown in FIG. 1 and the side protectors shown in FIG. 3 were made by way of test according to the specification listed in Table 1. As a reference, a tire having the basic structure shown in FIG. 1 and the side protectors shown in FIG. 6 was made by way of test. The side protectors of the tire as the reference are arranged at the same pitch as the pitch of the shoulder blocks, and do not include the first grooves and the second grooves. The tires as the examples and the tires as the reference have substantially the same configuration except for the configuration of the side protectors and the recessed portions. For each of the test tires, the mud performance and the durability were tested. The test methods are as follows.
<Mud Performance>

For each of the test tires mounted on the following test car under the following conditions, the traction was evaluated based on the driver's feeling during running on a muddy road covered with about 200 mm deep mud. The results are indicated by an evaluation point based on the reference being 100, wherein the larger the numerical value, the better the mud performance is.

Rim: 17×7.5
Tire pressure: 220 kPa
Test car: 4WD car with displacement of 4000 cc
Test tire mounting position: all wheels
<Durability>

Each of the test tires mounted on the above rim and inflated to the above pressure was run on a drum tester under the following conditions and then a running distance until damage such as cracks occurred in the side protectors was measured. The results are indicated by an index based on the running distance of the reference being 100, wherein the larger the numerical value, the better the durability is.

Speed: 80 km/h
Longitudinal load: 5.88 kN
The test results are shown in Table 1.

TABLE 1

Figure 6:
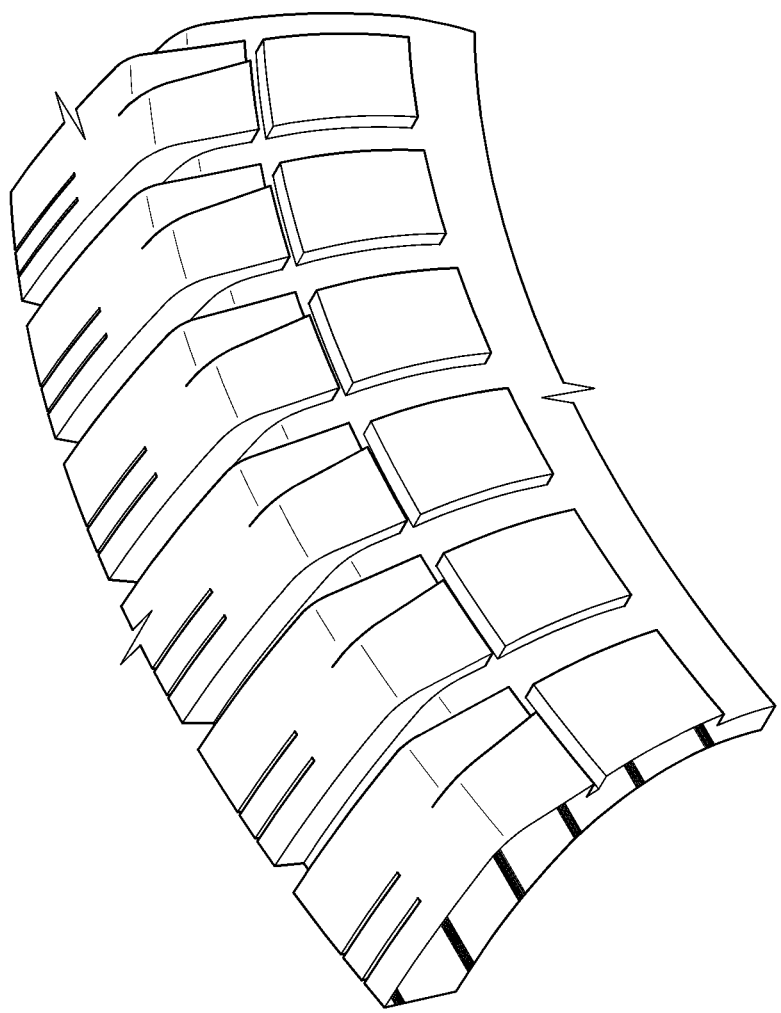
FIG. 6 is an enlarged perspective view of the shoulder land region and the sidewall portion of a pneumatic tire of a reference.

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Figure showing Side protectors | FIG. 6 | FIG. 3 | FIG. 3 | FIG. 3 | FIG. 3 | FIG. 3 | FIG. 3 | FIG. 3 | FIG. 3 |
| Second pitches P2/First pitches P1 | 1.0 | 1.8 | 1.5 | 2.0 | 2.5 | 1.8 | 1.8 | 1.8 | 1.8 |
| Opening widths W1 of Recessed portions/Opening widths W2 of Shoulder lateral grooves | 1.3 | 2.5 | 2.5 | 2.5 | 2.5 | 2.0 | 3.0 | 2.5 | 2.5 |
| Overlap length of First groove and Second groove/Maximum | — | 0.25 | 0.25 | 0.25 | 0.25 | 0.25 | 0.25 | 0.09 | 0.20 |

TABLE 1-continued

|  |  |  |  |  |  |  |  |  |
|---|---|---|---|---|---|---|---|---|
| widths W5 of Side protectors |  |  |  |  |  |  |  |  |
| Angle θ1 of First portion of Recessed portion [degree] | — | 35 | 35 | 35 | 35 | 35 | 35 | 35 | 35 |
| Angle θ2 of Second portion of Recessed portion [degree] | — | 60 | 60 | 60 | 60 | 60 | 60 | 60 | 60 |
| Angle θ3 of Third portion of Recessed portion [degree] | — | 60 | 60 | 60 | 60 | 60 | 60 | 60 | 60 |
| Mud performance [evaluation point] | 100 | 112 | 112 | 110 | 108 | 108 | 112 | 107 | 110 |
| Durability [index] | 100 | 104 | 102 | 104 | 105 | 106 | 101 | 105 | 104 |

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Figure showing Side protectors | FIG. 3 | FIG. 3 | FIG. 3 | FIG. 3 | FIG. 3 | FIG. 3 | FIG. 3 | FIG. 3 | FIG. 3 |
| Second pitches P2/First pitches P1 | 1.8 | 1.8 | 1.8 | 1.8 | 1.8 | 1.8 | 1.8 | 1.8 | 1.8 |
| Opening widths W1 of Recessed portions/Opening widths W2 of Shoulder lateral grooves | 2.5 | 2.5 | 2.5 | 2.5 | 2.5 | 2.5 | 2.5 | 2.5 | 2.5 |
| Overlap length of First groove and Second groove/Maximum widths W5 of Side protectors | 0.30 | 0.43 | 0.25 | 0.25 | 0.25 | 0.25 | 0.25 | 0.25 | 0.25 |
| Angle θ1 of First portion of Recessed portion [degree] | 35 | 35 | 20 | 25 | 45 | 35 | 35 | 35 | 35 |
| Angle θ2 of Second portion of Recessed portion [degree] | 60 | 60 | 60 | 60 | 60 | 50 | 70 | 60 | 60 |
| Angle θ3 of Third portion of Recessed portion [degree] | 60 | 60 | 60 | 60 | 60 | 60 | 60 | 45 | 65 |
| Mud performance [evaluation point] | 112 | 113 | 109 | 111 | 112 | 111 | 112 | 111 | 112 |
| Durability [index] | 103 | 102 | 105 | 104 | 104 | 104 | 104 | 104 | 102 |

From the test results, it can be confirmed that the tires as the examples exerted excellent mud performance while improving the durability of the sidewall portions.

The invention claimed is:

1. A pneumatic tire comprising
a tread portion;
a pair of sidewall portions each extending inwardly in a tire radial direction from both end portions of the tread portion;
a bead portion formed on an inside of each of the sidewall portions in the tire radial direction;
a plurality of shoulder blocks divided by shoulder lateral grooves, wherein the shoulder blocks are arranged in the tire circumferential direction with first pitches on at least one of the end portions of the tread portion;
a plurality of side protectors protruding outwardly in a tire axial direction on at least one of the sidewall portions which is located on a side of the shoulder blocks;
a recessed portion between a pair of side protectors adjacent in the tire circumferential direction, wherein the recessed portion is provided at a position so as to connect with one of the shoulder lateral grooves;
the side protectors being arranged in the tire circumferential direction with second pitches larger than the first pitches; and
each of the side protectors being provided with one first groove extending inwardly in the tire radial direction from a side of the tread portion and terminating within the side protector and a pair of second grooves extending outwardly in the tire radial direction from a side of the bead portion and terminating within the side protector and provided on both sides in the tire circumferential direction of the first groove.

2. The pneumatic tire according to claim 1, wherein, the first groove and the second groove are each inclined to a same direction with respect to the tire radial direction.

3. The pneumatic tire according to claim 1, wherein, an inner end of the first groove in the tire radial direction is located inward of an outer end of the second groove in the tire radial direction.

4. The pneumatic tire according to claim 1, wherein, the recessed portion extends obliquely with respect to the tire radial direction so that adjacent side protectors overlap each other when viewed in the tire radial direction.

5. The pneumatic tire according to claim 1, wherein, in a front view of the sidewall portions, terminating end portions of the first groove and the second groove are rounded in an arc shape.

6. The pneumatic tire according to claim 1, wherein, a width of the recessed portion gradually decreases inwardly in the tire radial direction.

7. The pneumatic tire according to claim 1, wherein, the recessed portion is formed in a shape having at least one bent portion.

8. The pneumatic tire according to claim 1, wherein, the second pitches are twice as large as the first pitches.

9. The pneumatic tire according to claim 1, wherein, each of the side protectors are provided so as to extend over two adjacent shoulder blocks.

10. The pneumatic tire according to claim 1, wherein, the shoulder blocks are divided by shoulder lateral grooves, and an opening width of the recessed portion is larger than an opening width of the shoulder lateral grooves.

11. The pneumatic tire according to claim 1, wherein, one of the second grooves disposed on one side of the first groove is connected with the recessed portion.

12. The pneumatic tire according to claim 1, wherein,
the recessed portion includes a first portion provided radially outermost, a second portion connected with the first portion on the inside thereof in the tire radial direction, and a third portion connected with the second portion on the inside thereof in the tire radial direction, and
a center line of the first portion is inclined at an angle in a range of from 25 to 45 degrees with respect to the tire radial direction.

13. The pneumatic tire according to claim 12, wherein, at least one of edges of the third portion is connected with the edge of the second portion in a bent manner.

14. The pneumatic tire according to claim 12, wherein, a center line of the third portion is inclined at an angle in a range of from 45 to 65 degrees with respect to the tire radial direction.

15. The pneumatic tire according to claim 11, wherein, the second groove disposed on the one side of the first groove is provided at a position farther away from the first groove than the second groove disposed on the other side of the first groove.

16. The pneumatic tire according to claim 12, wherein, an angle with respect to the tire radial direction of the second groove is smaller than an angle with respect to the tire radial direction of the second portion of the recessed portion.

17. The pneumatic tire according to claim 11, wherein, a maximum width of the second groove on the one side of the first groove and a maximum width of the second groove on the other side of the first groove are smaller than a maximum width of the first groove.

18. The pneumatic tire according to claim 1, wherein, an overlap length in the tire radial direction between an inner end of the first groove and an outer end of the second groove is not less than 0.09 times and not greater than 0.43 times a maximum width of the side protectors in the tire radial direction.

19. A pneumatic tire comprising
a tread portion;
a pair of sidewall portions each extending inwardly in a tire radial direction from both end portions of the tread portion;
a bead portion formed on an inside of each of the sidewall portions in the tire radial direction;
a plurality of shoulder blocks arranged in the tire circumferential direction with first pitches on at least one of the end portions of the tread portion;
a plurality of side protectors protruding outwardly in a tire axial direction on at least one of the sidewall portions which is located on a side of the shoulder blocks;
a recessed portion between a pair of side protectors adjacent in the tire circumferential direction;
the side protectors being arranged in the tire circumferential direction with second pitches larger than the first pitches; and
each of the side protectors being provided with one first groove extending inwardly in the tire radial direction from a side of the tread portion and terminating within the side protector and a pair of second grooves extending outwardly in the tire radial direction from a side of the bead portion and terminating within the side protector and provided on both sides in the tire circumferential direction of the first groove, wherein one of the second grooves disposed on one side of the first groove is connected with the recessed portion.

20. A pneumatic tire comprising
a tread portion;
a pair of sidewall portions each extending inwardly in a tire radial direction from both end portions of the tread portion;
a bead portion formed on an inside of each of the sidewall portions in the tire radial direction;
a plurality of shoulder blocks arranged in the tire circumferential direction with first pitches on at least one of the end portions of the tread portion;
a plurality of side protectors protruding outwardly in a tire axial direction on at least one of the sidewall portions which is located on a side of the shoulder blocks;
a recessed portion between a pair of side protectors adjacent in the tire circumferential direction;
the side protectors being arranged in the tire circumferential direction with second pitches larger than the first pitches; and
each of the side protectors being provided with one first groove extending inwardly in the tire radial direction from a side of the tread portion and terminating within the side protector and a pair of second grooves extending outwardly in the tire radial direction from a side of the bead portion and terminating within the side protector and provided on both sides in the tire circumferential direction of the first groove, wherein an overlap length in the tire radial direction between an inner end of the first groove and an outer end of the second groove is not less than 0.09 times and not greater than 0.43 times a maximum width of the side, protectors in the tire radial direction.

* * * * *